J. SCHARLIE.
POST HOLE AUGER.
APPLICATION FILED JAN. 19, 1918.
1,270,556.
Patented June 25, 1918.
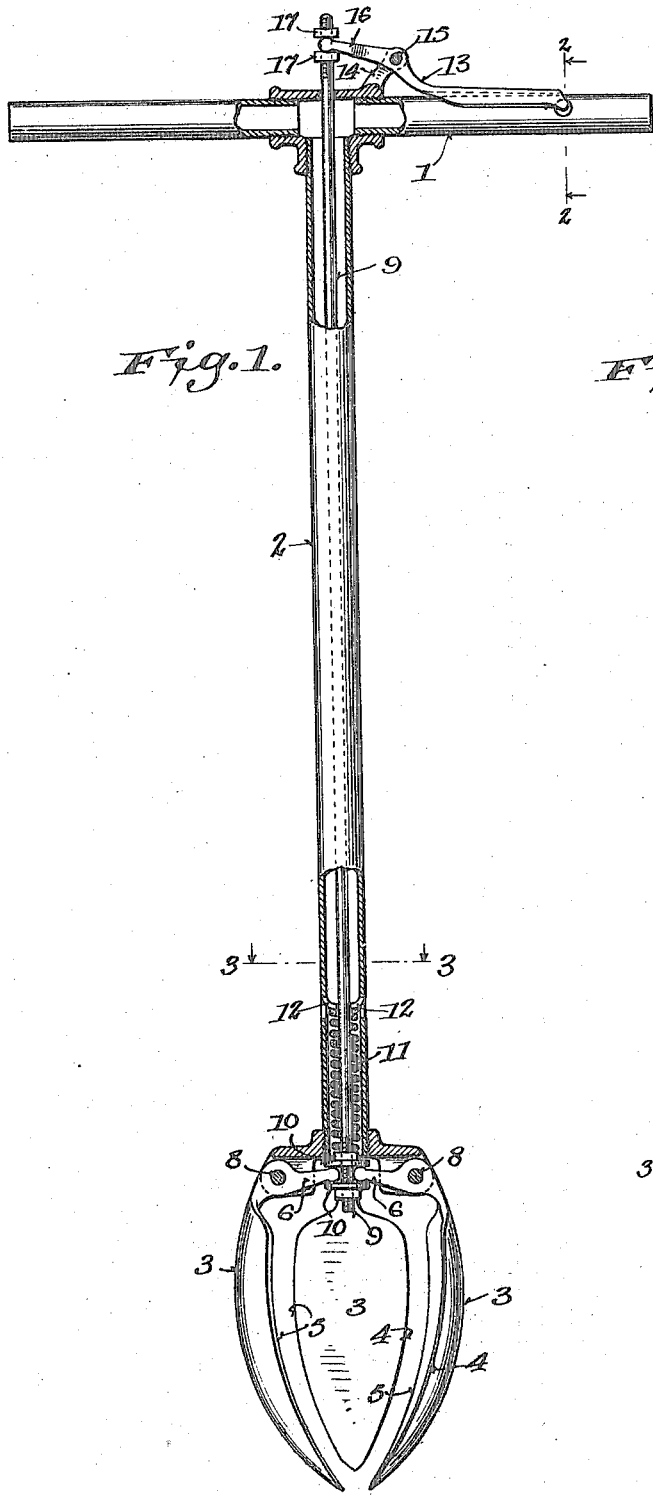
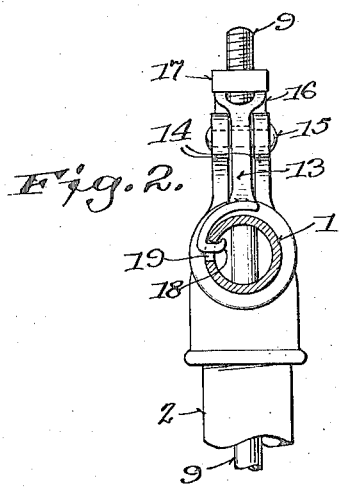
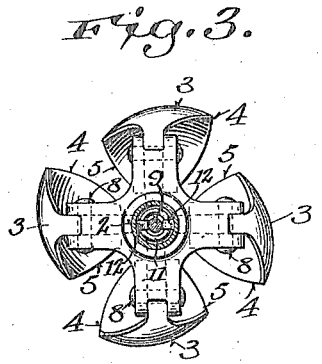
Inventor
John Scharlie
By Enrie & Wheeler
Attorneys.

UNITED STATES PATENT OFFICE.

JOHN SCHARLIE, OF JANESVILLE, WISCONSIN.

POST-HOLE AUGER.

1,270,556.  Specification of Letters Patent.  Patented June 25, 1918.

Application filed January 19, 1918. Serial No. 212,549.

*To all whom it may concern:*

Be it known that I, JOHN SCHARLIE, a citizen of the United States, residing at Janesville, county of Rock, and State of Wisconsin, have invented new and useful Improvements in Post-Hole Augers, of which the following is a specification.

My invention relates to improvements in post hole augers, and it pertains more especially to the device for opening or spreading the blades of the auger when removed from the post hole, whereby the earth accumulated therein is free to be discharged; and second to the device for rigidly locking such blades in their closed position.

My invention is further explained by reference to the accompanying drawing, in which—

Figure 1 represents a side view thereof, part broken away to better show the interior construction.

Fig. 2 is a vertical section, drawn on line 2—2 of Fig. 1, and

Fig. 3 is a transverse section, drawn on line 3—3 of Fig. 1.

Like parts are referred to by the same reference numerals throughout the several views.

The operating handle 1 and tubular member 2 are substantially of ordinary construction. Several blades 3 are preferably so set or formed that their front edges 4 extend outwardly so that they when turned describe a larger circle than their rear edges 5, whereby the boring of the post hole is facilitated. The several blades 3 are each provided at their upper ends with levers 6, and said blades are each pivotally connected at the junction of said levers therewith by pivotal bolts 8, while the face or outer ends of said levers 6 are connected with the vertical rod 9 by and between the nuts or disks 10, 10, whereby said blades are adapted to be moved outwardly and inwardly as said rod 9 is lowered and raised. Said blades 3 are adapted to be automatically spread and moved outwardly by the recoil of the spiral spring 11. The spring 11 is interposed between the inturned lugs 12, 12, and the upper nut or disk 10, whereby it, said spring, is adapted by its recoil to move said rod 9 downwardly whereby said blades are moved away from each other preparatory to removing the earth therefrom. The blades are locked and held in their closed position, as shown in Fig. 1, by the lever 13. The lever 13 is connected with the handle 1 by the bracket 14 and pivotal bolt 15, while the short arm 16 is connected with said rod 9 by and between the nuts or disks 17, 17. The long arm of said lever 13 is provided with a hooked member 18 which, when forced downwardly, enters the hole 19 of said handle 1, whereby said lever 13 is held down, and whereby said rod 9 is held in its raised position and whereby said blades 3 are locked in their closed position shown in Fig. 1.

Having thus described my invention what I claim as new and desire to secure by Letters Patent, is:—

1. In a device of the described class, the combination of a vertical tubular member provided near its lower end with a plurality of slots, a plurality of inturned lugs formed at the upper ends of said slots, a spiral spring located in said tubular member, and adapted to bear at its upper end against said inturned lugs, a vertical rod located in said tubular member provided near its lower end with a pair of nuts or disks against the upper one of which pair of nuts or disks said spiral spring is adapted to bear, a plurality of blades, an arm or lever attached to the upper end of each of said blades, the free or outer ends of said arms or levers being located between said nuts or disks whereby as said rod is forced downwardly by the recoil of said spring said blades are adapted to separate or to be thrown apart, all substantially as and for the purpose specified.

2. A structure as recited in claim 1, in combination with a handle on the tubular member, a lever pivotally attached to said handle, a pair of nuts or disks attached to the upper end of said rod, the short arm of said lever being located between and adapted to bear against said nuts or disks, an aperture formed in said handle, a hooked member attached to said lever and adapted to enter said aperture, whereby said lever is retained when down and said blades are securely retained in their closed position.

In testimony whereof I affix my signature in the presence of two witnesses.

JOHN SCHARLIE.

Witnesses:
JOHN WEHINGER,
FRANZIS WEHINGER.

Copies of this patent may be obtained for five cents each, by addressing the "Commissioner of Patents, Washington, D. C."